(12) United States Patent
Edelman et al.

(10) Patent No.: US 8,150,918 B1
(45) Date of Patent: Apr. 3, 2012

(54) CLIENT CONTROLLABLE SERVER-SIDE PLAYLISTS

(75) Inventors: Bradley Edelman, San Francisco, CA (US); Jonathan Gay, Mill Valley, CA (US); Slavik Lozben, San Francisco, CA (US); Stephen Cheng, Foster City, CA (US); Pritham Shetty, Los Altos, CA (US)

(73) Assignee: Adobe Systems Incorporated, San Jose, CA (US)

( * ) Notice: Subject to any disclaimer, the term of this patent is extended or adjusted under 35 U.S.C. 154(b) by 0 days.

(21) Appl. No.: 12/580,008

(22) Filed: Oct. 15, 2009

Related U.S. Application Data

(63) Continuation of application No. 10/353,811, filed on Jan. 29, 2003, now Pat. No. 7,617,278.

(51) Int. Cl.
*G06F 15/16* (2006.01)
(52) U.S. Cl. ........ 709/204; 709/205; 709/206; 709/219; 709/226; 709/203; 709/223; 709/231; 709/229; 719/312; 719/313; 719/314; 715/734; 715/753; 715/733
(58) Field of Classification Search .......... 709/201–206, 709/226–229, 219
See application file for complete search history.

(56) References Cited

U.S. PATENT DOCUMENTS

| | | | |
|---|---|---|---|
| 5,751,968 A | 5/1998 | Cohen et al. | |
| 5,805,804 A | 9/1998 | Laursen et al. | |
| 5,841,432 A | 11/1998 | Carmel et al. | |
| 5,892,915 A | 4/1999 | Duso et al. | |
| 5,956,719 A | 9/1999 | Kudo et al. | |
| 6,023,271 A | 2/2000 | Quaeler-Bock et al. | |
| 6,044,205 A | 3/2000 | Reed et al. | |
| 6,064,379 A | 5/2000 | DeMoney | |
| 6,085,252 A | 7/2000 | Zhu et al. | |
| 6,105,072 A | 8/2000 | Fischer | |
| 6,112,024 A | 8/2000 | Almond et al. | |
| 6,125,369 A | 9/2000 | Wu et al. | |
| 6,148,334 A | 11/2000 | Imai et al. | |
| 6,163,796 A | 12/2000 | Yokomizo | |

(Continued)

FOREIGN PATENT DOCUMENTS

WO 2009003683 1/2009

OTHER PUBLICATIONS

Advantages of On2 VP6 Technology, Oct. 20, 2006, published by On2 Technologies, Inc., 18 pages.

(Continued)

*Primary Examiner* — Jude Jean Gilles
(74) *Attorney, Agent, or Firm* — Fish & Richardson P.C.

(57) ABSTRACT

A system and method is disclosed for establishing an interactive multimedia application environment in which server-side streaming media may be controlled by a client using a programming model provided at both a communication server and an interactive multimedia runtime on the client. The application program interface (API) preferably provides methods for the client user to establish a stream of data from the client to the communication server in addition to allowing a stream from the communication server to the client. The API also preferably allows the user at a client to exert control over the broadcasting of the media streams. Streams may be built, edited, paused, stopped, augmented, and the like by the client user. Each function that the client user may operate on the broadcast media stream is preferably viewable by all of the other subscribing clients.

18 Claims, 6 Drawing Sheets

```
60 ⎧ 600 ⟶ connection=new NetConnection();      605
   ⎨ 601 ⟶ connection.connect("rtmp://myRTMPServer.myDomain.com/app");
   ⎪
   ⎪ 602 ⟶ myStream=new NetStream(connection);
   ⎪ 603 ⟶ myStream.attachVideo(Camera.get());
   ⎩ 604 ⟶ myStream.publish("myWeddingVideo");
                                    606

61 ⎧ 607 ⟶ connection=new NetConnection();      605
   ⎨ 608 ⟶ connection.connect("rtmp://myRTMPServer.myDomain.com/app");
   ⎪
   ⎪ 609 ⟶ myStream=new NetStream(connection);
   ⎩ 610 ⟶ myStream.play("myWeddingVideo");
                                    606
```

U.S. PATENT DOCUMENTS

| | | | |
|---|---|---|---|
| 6,216,157 B1 | 4/2001 | Vishwanath et al. | |
| 6,330,006 B1 | 12/2001 | Goodisman | |
| 6,397,230 B1 | 5/2002 | Carmel et al. | |
| 6,453,355 B1 | 9/2002 | Jones et al. | |
| 6,477,580 B1 | 11/2002 | Bowman-Amuah | |
| 6,487,564 B1 | 11/2002 | Asai et al. | |
| 6,549,934 B1 | 4/2003 | Peterson et al. | |
| 6,631,418 B1 | 10/2003 | Watkins | |
| 6,665,865 B1 | 12/2003 | Ruf | |
| 6,744,763 B1 | 6/2004 | Jones et al. | |
| 6,760,378 B1 | 7/2004 | Conklin | |
| 6,763,390 B1 | 7/2004 | Kovacevic et al. | |
| 6,801,947 B1 | 10/2004 | Li | |
| 6,823,394 B2 | 11/2004 | Waldvogel et al. | |
| 6,877,010 B2 | 4/2005 | Smith-Semedo et al. | |
| 6,985,932 B1 | 1/2006 | Glaser et al. | |
| 6,990,497 B2 | 1/2006 | O'Rourke et al. | |
| 6,999,424 B1 | 2/2006 | Kovacevic et al. | |
| 7,003,570 B2 | 2/2006 | Messinger et al. | |
| 7,133,922 B1 | 11/2006 | She et al. | |
| 7,149,813 B2 | 12/2006 | Flanagin et al. | |
| 7,287,256 B1 | 10/2007 | Lozben et al. | |
| 7,383,289 B2 | 6/2008 | Kraft et al. | |
| 2001/0004417 A1 | 6/2001 | Narutoshi et al. | |
| 2001/0044851 A1* | 11/2001 | Rothman et al. | 709/231 |
| 2002/0055989 A1 | 5/2002 | Stringer-Calvert et al. | |
| 2002/0065926 A1 | 5/2002 | Hackney et al. | |
| 2002/0103815 A1 | 8/2002 | Duvillier et al. | |
| 2002/0116716 A1 | 8/2002 | Sideman | |
| 2002/0165907 A1* | 11/2002 | Dornquast et al. | 709/203 |
| 2003/0046431 A1 | 3/2003 | Belleguie | |
| 2003/0061369 A1 | 3/2003 | Aksu et al. | |
| 2003/0115268 A1 | 6/2003 | Esposito | |
| 2003/0154239 A1 | 8/2003 | Davis et al. | |
| 2003/0161324 A1 | 8/2003 | Clemens et al. | |
| 2003/0187993 A1 | 10/2003 | Ribot | |
| 2003/0221014 A1 | 11/2003 | Kosiba et al. | |
| 2004/0032424 A1 | 2/2004 | Florschuetz | |
| 2004/0098533 A1 | 5/2004 | Henshaw et al. | |
| 2004/0215803 A1 | 10/2004 | Yamada et al. | |
| 2005/0083401 A1 | 4/2005 | Mizutani et al. | |
| 2006/0161516 A1 | 7/2006 | Clarke et al. | |
| 2008/0320155 A1 | 12/2008 | Ganapathy et al. | |
| 2009/0119594 A1 | 5/2009 | Hannuksela | |

OTHER PUBLICATIONS

Chapter 6: What is Streaming Media and How does it Work?, Jul. 18, 2007, published by the Internet Society, <http://service.real.comlhelp/player/plus manual. g2/htrnlfiles/whatisrp .htm, 13 pages.

"Common Multimedia Formats and Extentions", Jul. 18, 2007, published by SorensonMedia, <http://www.sorensontech.comllearn/video__file__format.php>, 2 pages.

Quicktime Streaming Server Administrator's Guide. 2002, published by Apple Computer, Inc., 84 pages.

Schulzrinne, H. et al. "Real Time Streaming Protocol (RTSP)", Apr. 1998, published by The Internet Society, 86 pages.

"Truemotion VP7 Video Codec", Jan. 10, 2005, published by On2 Technologies, Inc., 13 pages.

* cited by examiner

```
500 — nc=new NetConnection();              506
501 — nc.connect("rtmp://mySvr.myDomain.com//App");
502 — ns=new NetStream(nc);  507
503 — ns.attachAudio(Microphone.get());
504 — ns.attachVideo(Camera.get());
                              508
505 — ns.publish("todays_news");
                              509

510 — ns2=new NetStream(nc);
511 — myVideoArea.attachVideo(ns2);
512 — ns2.play("todays_news");
                              509
```

FIG. 6

```
600 — connection=new NetConnection();           605
601 — connection.connect("rtmp://myRTMPServer.myDomain.com/app");
60 {
602 — myStream=new NetStream(connection);
603 — myStream.attachVideo(Camera.get());
604 — myStream.publish("myWeddingVideo");
                          606

607 — connection=new NetConnection();           605
608 — connection.connect("rtmp://myRTMPServer.myDomain.com/app");
61 {
609 — myStream=new NetStream(connection);
610 — myStream.play("myWeddingVideo");
                          606
```

FIG. 11

```
        //Setup the server stream
1101 — application.myStream=Stream.get("MacromediaNews");

1102 — if(application.myStream)
       {
           //this server stream will play pre-recorded file
           "introduction" for 5 seconds before it switches
           to a live feed stream of "live1"
1100 {
1103 — application.myStream.play("introduction", 0, 5);

1104 — application.myStream.play("live1", -1, -1, false);
       }
```

FIG. 7

```
                                                        705
            //Setup the server stream          ⎯⎯⎯⎯⎯⎯
    700⎯ application.myStream=Stream.get("MacromediaNews");

701⎯ if(application.myStream)
         {
             //this server stream will play "tape1", "tape2"
             //and "=live1" for 5   seconds each
                                              706
                                           ⎯⎯⎯⎯⎯
    702⎯ application.myStream.play("tape1", 0, 5);
                                              707
                                           ⎯⎯⎯⎯⎯⎯⎯
    703⎯ application.myStream.play("tape2", 0, 5, false);
                                              708
                                           ⎯⎯⎯⎯⎯⎯⎯
    704⎯ application.myStream.play("live", −1, 5, false);
         }

709⎯ connection=New NetConnection();      714
                                           ⎯⎯⎯⎯⎯⎯⎯⎯⎯⎯⎯⎯⎯⎯⎯⎯⎯⎯⎯
    710⎯ connection.connect("rtmp://myRTMPServer.myDomain.com/appMM");
    711⎯ myStream=new NetStream(connection);
    712⎯ myVideoArea.attachVideo(myStream);
    713⎯ myStream.play("MacromediaNews");
                          ⎯⎯⎯⎯⎯⎯⎯⎯
                             705
```

*FIG. 8*

```
                            //Setup the server Stream         806
     800 ─ application.myStream=Stream.get("MacromediaNews");

801 ─ if(application.myStream)
           {
                    //this server stream will play "tape1", "tape2"
80 {                //and "=live1" for 5  seconds each
           802 ─ application.myStream.record();
           803 ─ application.myStream.play("tape1", 0, 5);
           804 ─ application.myStream.play("tape2", 0, 5, false);
           805 ─ application.myStream.play("live", -1, 5, false);
           }

807 ─ connection=New NetConnection();           812
     808 ─ connection.connect("rtmp://myRTMPServer.myDomain.com/appMM");
81 { 809 ─ myStream=new NetStream(connection);
     810 ─ myVideoArea.attachVideo(myStream);
     811 ─ myStream.play("MacromediaNews");
                                        806
```

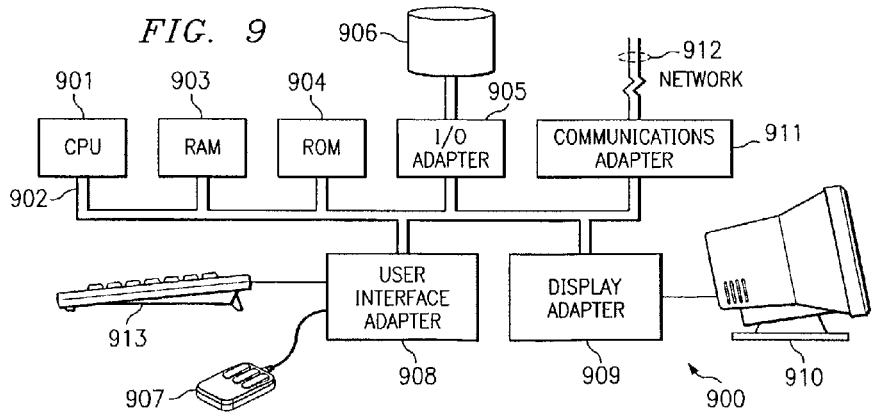

*FIG. 9*

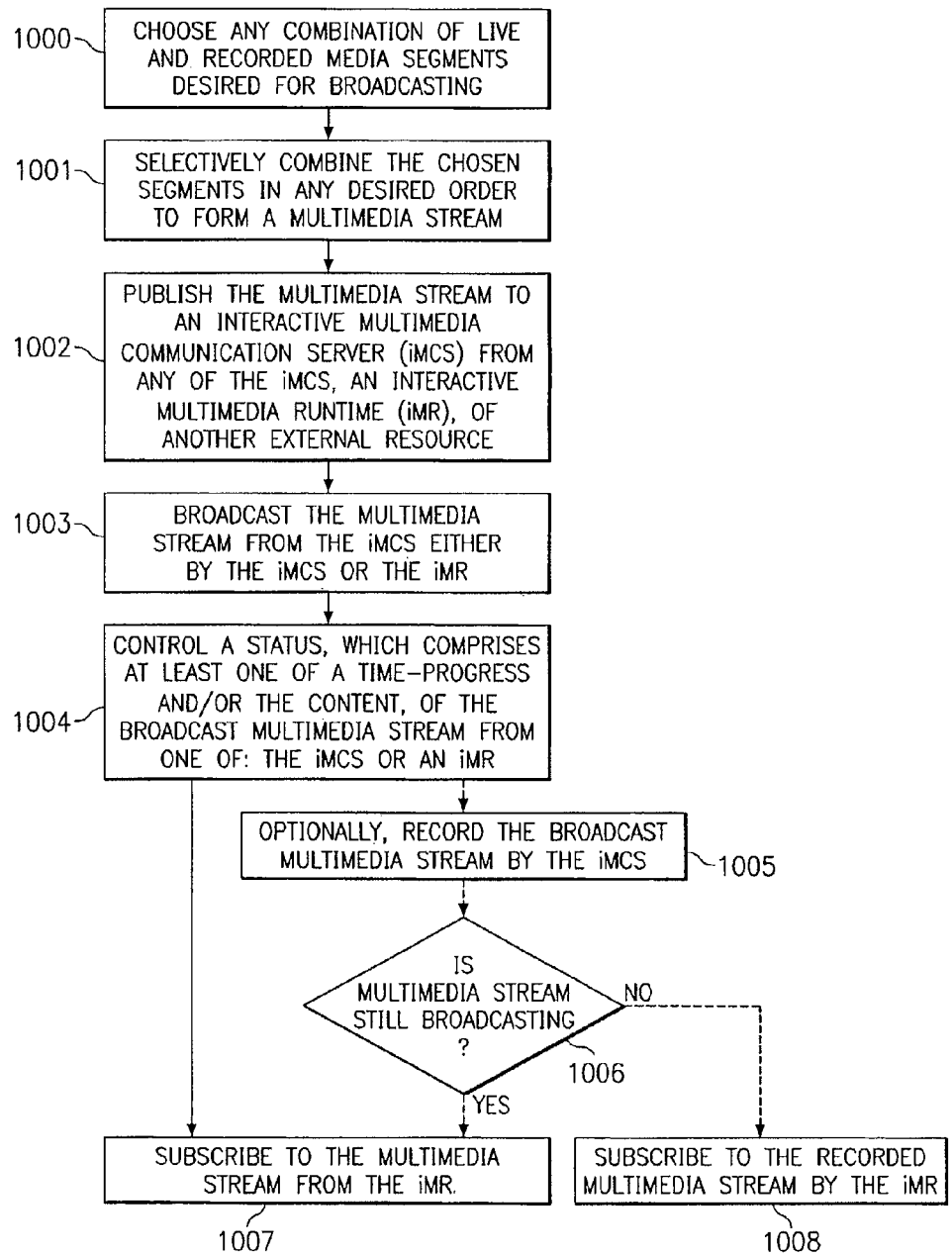

CLIENT CONTROLLABLE SERVER-SIDE PLAYLISTS

CROSS REFERENCE TO RELATED APPLICATIONS

This application is a continuation of and claims the benefit of the priority of U.S. patent application Ser. No. 10/353,811, filed Jan. 29, 2003, entitled "Client Controllable Server-Side Playlists", and is hereby incorporated by reference.

TECHNICAL FIELD

The present invention relates, in general, to broadcasting Internet media, and, more specifically, to a system and method for providing a client controllable server-side playlist.

BACKGROUND OF THE RELATED ART

Streaming media is a technology that has steadily grown over the course of the Internet's popularity. A media stream is generally a cohesive segment of some media, such as video, audio, data, or the like. In a typical application a user may access a streaming media source to listen to music, view a movie or video feed, whether live or pre-recorded, all played from a remote server. The server generally sends the media segments across the Internet to the user, who generally must have a compatible media player to view the steaming media. Many different users may access the media stream, referred to as subscribing, to view or play the same content. Players such as the MICROSOFT WINDOWS MEDIA PLAYER™, REALNETWORK'S REALONE PLAYER™ and REALPLAYER™, QUICKTIME™ PLAYER, and the like, render the different media streams depending on their formats and display or play the media to the user.

Playlists are generally a list of media segments that are played in the playlist order. For example, radio stations typically plan the songs they will play throughout any given day by assembling a list of artists and songs for the disc jockeys to either play or monitor. In digital media, a sequence of media segments, for example, music, can be played one after the other either on a user's local machine, or played on the server side. Most media players, such as the MICROSOFT WINDOWS MEDIA PLAYER™, allow a user to assemble a list of digitally recorded songs or video clips on the user's computer to play in any sequence selected by the user.

Streaming media is generally played from the server side, allowing individual users to subscribe to the media streams. Server-side programmers and administrators may basically combine snippets from different media files and treat them as one media output or stream. A television broadcasts is a similar concept where the content and advertisements are interspersed with each other with the user watching them on a single channel. While the media is being switched from one to another, the user does not intervene in anyway and experiences only a "single" stream of the channel broadcast. One of the limitations with this server-side playlist scheme is that the user must usually not only know what it is that the user wants to view (i.e., the media format and access address), but the media must also typically have an explicit resource as well (e.g., channel 1, 6, and the like).

While playlists may provide the user with multimedia content that is very rich and very entertaining or informational, it is still a rather static experience among the growing number of dynamic and interactive applications appearing on the Internet. The user can subscribe or unsubscribe and, when subscribed, see or hear only the content playing on the server. While this may be acceptable in the case of a movie or song, if the streaming media is an instructional program, the user can only sit and experience the media. Users may overcome this limitation by developing their own playlists locally. However, those playlists cannot generally be shared with other users across a network without copying the entire playlist content to the other users.

BRIEF SUMMARY

The present invention is directed to a system and method for establishing an interactive multimedia application environment in which server-side streaming media may be controlled not only from the server-side developers, but also from users at the client-side. A programming model is provided at a communication server and an interactive multimedia runtime on a client. The application program interface (API) preferably provides methods for the user at a client to establish a stream of data from the client to the communication server in addition to allowing a stream from the communication server to the client. The API also preferably allows the user at a client to exert control over the broadcasting of the media streams. Streams may be built, edited, paused, stopped, augmented, and the like by a user operating a client. Each function that the client user may operate on the broadcast media stream is preferably viewed by all of the other subscribing clients.

The foregoing has outlined rather broadly the features and technical advantages of the present invention in order that the detailed description of the invention that follows may be better understood. Additional features and advantages of the invention will be described hereinafter which form the subject of the claims of the invention. It should be appreciated by those skilled in the art that the conception and specific embodiment disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims. The novel features which are believed to be characteristic of the invention, both as to its organization and method of operation, together with further objects and advantages will be better understood from the following description when considered in connection with the accompanying figures. It is to be expressly understood, however, that each of the figures is provided for the purpose of illustration and description only and is not intended as a definition of the limits of the present invention.

BRIEF DESCRIPTION OF THE DRAWINGS

For a more complete understanding of the present invention, reference is now made to the following descriptions taken in conjunction with the accompanying drawing, in which:

FIG. 6 is a partial script listing demonstrating another embodiment of a capability to publish and subscribe to an example media stream according to the teachings described herein;

FIG. 7 is a partial script listing demonstrating another embodiment of a capability to publish and subscribe to an example media stream according to the teachings described herein;

FIG. 8 is a partial script listing demonstrating another embodiment of a capability to publish and subscribe to an example media stream according to the teachings described herein;

FIG. 9 depicts a block diagram of a computer system which is adapted to use the embodiments described herein;

FIG. 10 is a flowchart demonstrating the teachings of embodiments of a capability to publish and subscribe to an example media stream according to the teachings described herein; and FIG. 11 is a partial script listing demonstrating a further embodiment of a capability to publish to an existing media stream according to the teachings described herein.

DETAILED DESCRIPTION

Figure 1:
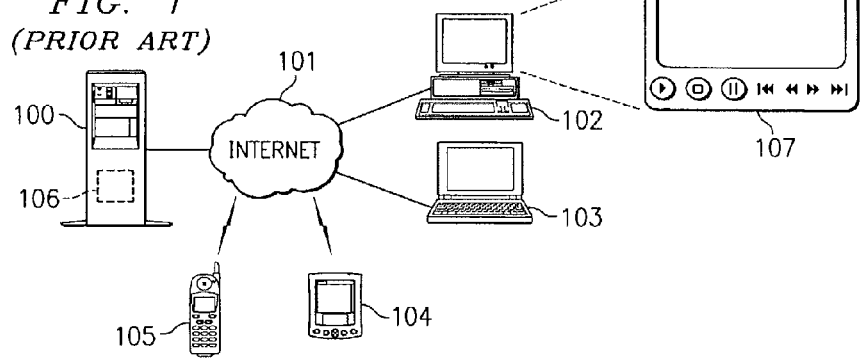
FIG. 1 is a block diagram illustrating the relationship of existing multimedia application environment.

Existing multimedia application environments (MAE) do not provide true interactivity with streaming media applications. Once the server has begun to broadcast the media stream, each accessing client or user may typically only play the stream. Individually, each client may pause or cut access to the stream, but the paused client will continue from the real-time point of the media stream. FIG. 1 is a block diagram illustrating the relationship of existing MAE. Server 100 connected to Internet 101 may serve several clients, clients 102-105. Within server 100, application server 106 provides a streaming media function, such as streaming music, to each of clients 102-105. Each of clients 102-105 will generally have a media player, such as player 107 shown on client 102, that reads the format of the streaming media and displays or plays the media to the user. Player 107 allows client 102 limited playback control, such as pausing or unsubscribing to the media stream. However, that control only effects client 102 locally. Client 102 cannot exert any additional control over the broadcast media at server 100.

Figure 2:
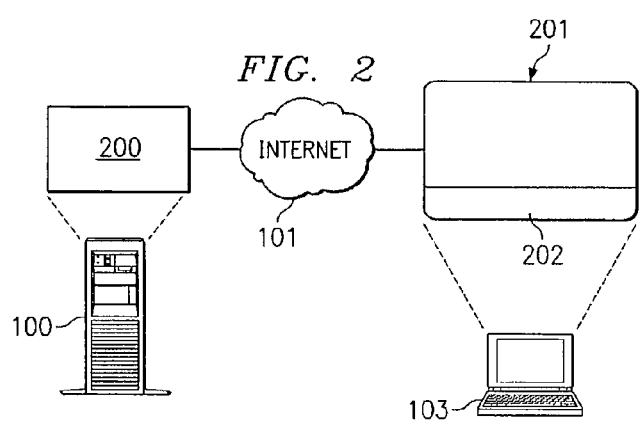
FIG. 2 is a block diagram illustrating an embodiment of an interactive multimedia application environment (iMAE) configured according to the teachings herein.

FIG. 2 is a block diagram illustrating an embodiment of an interactive multimedia application environment (iMAE) configured according to the teachings herein. Server 100 is connected to Internet 101 and serves client 103. The iMAE is formed by interactive multimedia communication server (iMCS) 200 operating on server 100 and interactive multimedia runtime (iMR) 201 operating on client 103. One example of iMCS 200 is MACROMEDIA'S FLASH COMMUNICATION SERVER™ with its corresponding iMR 201, MACROMEDIA'S FLASH™ PLAYER 6. A media stream may be played from iMCS 200 across Internet 101 to which client 103 may subscribe and view on iMR 201. Much as the process shown in FIG. 1, the streaming media flows from server 100 to client 103 through Internet 101. However, iMR 201 is interactive and may preferably have action panel 202 providing selected action choices to the user.

By selecting various functions provided on action panel 202, iMR 201 may preferably initiate a stream of data to iMCS 200. Therefore, unlike the process in FIG. 1, the multimedia environment established between server 100 and client 103 is two-way and interactive. Using this interactive gateway established between iMR 201 and iMCS 200, a user at client 103 may preferably build a personal playlist on server 100 to be played by iMCS 200. Moreover, a user may preferably stop or pause the stream, change or select specific resources, add media to in-progress streams, and the like. Each interaction may then preferably also be experienced by all of the subscribing clients. In this manner, personal playlists may preferably be built on-demand by client 103 at server 100 and then broadcast to each subscribing client.

It should be noted that the iMAE that is established between iMCS 200 and iMR 201 is made possible by a programming model that exists within each one. The programming model on the server-side provides a method of specifying the resource and the duration of how long to play that resource and/or when to start within that media resource. Considering a media resource as merely a time-based resource (i.e., it starts at zero seconds and it has a specified duration), a developer may preferably provide to play a given media segment starting at 10 seconds and continuing for another 10 seconds. In this manner, using the server-side programming model, a developer may preferably issue multiple commands to create or edit a media stream (e.g., play media X for 10 seconds followed by media Y for one hour, and then switch to a live feed after playing media Y). Thus, a server-side interface is provided that makes the playlist editing and/or creation simple.

In addition to providing control and access to server-side developers, the client-side programming model provides methods to the client that are communicated to and executed by the server. Therefore, a user, through the client-side application program interface (API) may also preferably issue the scripts or commands that are executable by the server to play media X for 10 seconds followed by media Y for one hour, and then switch to a live feed after playing media Y in the same way as the server-side developer.

Figure 3:
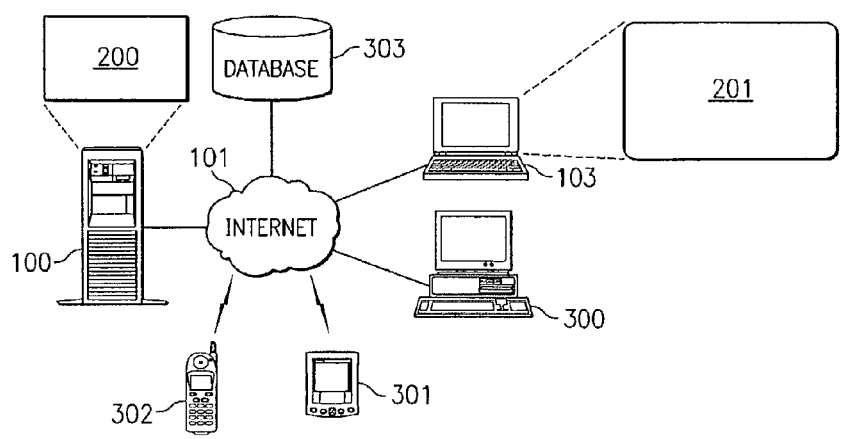
FIG. 3 is a block diagram illustrating an additional embodiment of an iMAE configured according to the teachings herein.

FIG. 3 is a block diagram illustrating an additional embodiment of an iMAE configured according to the teachings herein. Server 100 includes iMCS 200 which may broadcast streaming media over Internet 101. Clients 103, 300-302 each preferably include an iMR, such as iMR 201. Clients 103, 300-302 may each subscribe to the streaming media and display the media to the users. In operation, the user at client 103 may preferably wish to add a media segment to the media stream at server 100. Using the client-side API, the user may add a media segment from database 303 to the playlist at iMCS 200 on server 100. The user could stop or pause the broadcast of the media to add the media segment or may simply append the segment to the end of the playlist on iMCS 200 or may place the media where ever in the playlist that he or she, would like. Subscribing clients 300-302 would then preferably view the added media segment when iMCS 200 broadcasts the media segment on to the media stream.

Figures 4, 5:
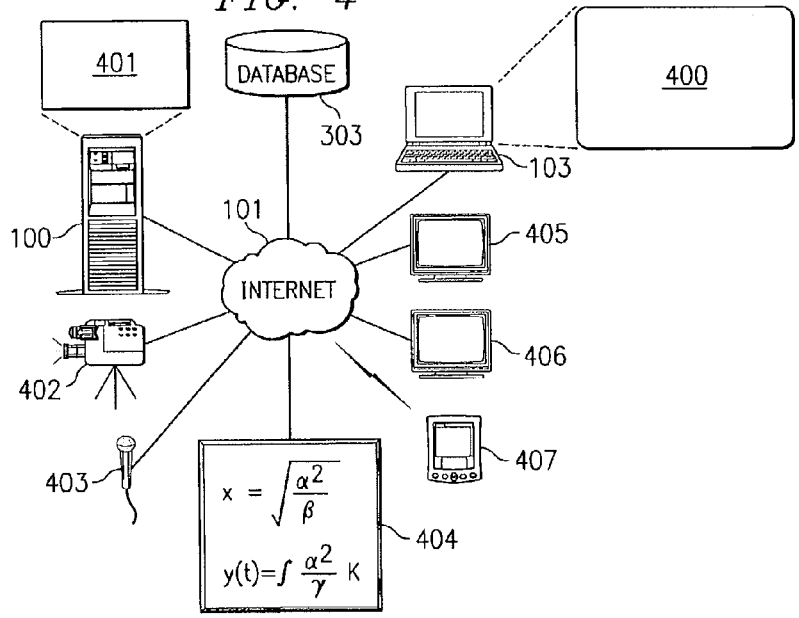
FIG. 4 is a block diagram illustrating an additional embodiment of an iMAE with multiple resources configured according to the teachings herein.
FIG. 5 is a partial script listing demonstrating one embodiment of a capability to publish and subscribe to an example media stream according to the teachings described herein.

FIG. 4 is a block diagram illustrating an additional embodiment of an iMAE with multiple resources configured according to the teachings herein. In operation, the iMAE may be leveraged to edit, splice, and broadcast from live and pre-recorded media segments with subscribing clients perceiving only a single, uninterrupted media stream. For example, a distance learning application may be managed to broadcast a mix of different streaming media segments to subscribing clients. The moderator at client 103 running iMR 400, such as MACROMEDIA'S FLASH™ PLAYER 6 along with its programming model ACTIONSCRIPT™ in the interactive multimedia development environment; MACROMEDIA FLASH MX™, may preferably instruct iMCS 401, such as MACROMEDIA'S FLASH COMMUNICATION SERVER™ to broadcast a video segment from camera resource 402 over Internet 101. Clients 405-407 may preferably subscribe to the streaming media to "attend" the seminar. At predetermined points, iMR 400 at client 103 may preferably instruct iMCS 401 to stop playing the video from camera resource 402 and signal iMR 400 to run or show a pre-saved MACROMEDIA FLASH™, MICROSOFT POWERPOINT™, or similar type of file, that may contain relevant slides or charts, stored in database 303 or in a memory local to each of subscribing clients 405-407. Once the MACROMEDIA FLASH™ or POWERPOINT™ file segment has been played, iMR 400 at client 103 may preferably instruct iMCS 401 to resume playing video from camera resource 402. However, even though iMCS 401 switches media types and media segments, and pre-recorded and live content are mixed and added after beginning the stream, clients 405-407 preferably perceive only a single, contiguous media stream.

IMR 400 at client 103 may also instruct iMCS 401 to stop playing video from camera source 402 to play a multimedia datastream from electronic whiteboard 404. The instructor in the video may desire to write up certain formulae in real time for viewing by each subscribing client. Because the media stream at iMCS 401 now broadcasts the datastream from electronic whiteboard 404, each of clients 405-407 may preferably view the live writing in real-time. This operation illustrates the ability of iMR 400 and iMCS 401 to interleave live and recorded content and to do so "on-the-fly," when the originating stream has already begun.

In additional embodiments, a user of any of clients 405-407 may wish to participate in the seminar by asking the lecturer a question. In such embodiments, microphone resource 403 may be made available to any or all of clients 405-407, or may be representative of a microphone peripheral attached to any one of more of clients 405-407. When a client, such as client 405, desires to ask a question, iMR 400 at client 103 may preferably instruct iMCS 401 to stop playing the media stream from camera resource 402 and play the audio stream captured from microphone resource 403. Because iMCS 401 is now streaming the live audio captured from the user of client 405, each of the subscribing clients may listen to the user's question. The lecturer may be set up to either hear the audio directly from microphone resource 403 or may have his or her own subscribed client (not shown) to hear the audio. Therefore, by utilizing the client side API of iMR 400 at client 103, a complete iMAE is established in which live media and pre-recorded media may preferably be assembled and broadcast in a single streaming media source.

Moreover, regardless of which format the media segments are stored or created in, each subscribing client only sees a common, single media stream playing on the iMR, such as MACROMEDIA'S FLASH™ PLAYER 6. Furthermore, the users at the subscribing clients preferably do not see or have to deal with changing the locations of the different media resources. The embodiments described herein preferably provide a single access point to the streaming media. Management of that media stream is preferably performed on the server-side, either by server-side developers or by client-side developers with, for example, ACTIONSCRIPT™ from MACROMEDIA'S FLASH MX™ development environment.

All media stream management is preferably directed by the programming model within an interactive multimedia development environment (iMDE). One example of a programming model capable of providing the features and elements of the embodiments described herein is MACROMEDIA'S ACTIONSCRIPT™ API. It should be noted that the features and elements described herein may also be programmed and controlled by other similar programming models and APIs. However, for purposes of this disclosure, ACTIONSCRIPT™ is used as an example in FIGS. 5 and 6.

FIG. 5 is a partial script listing demonstrating one embodiment of a capability to publish and subscribe to an example media stream according to the teachings described herein. In lines 500 and 501, a connection is established between the publishing client and the broadcasting iMCS 506. Broadcasting iMCS 506 is located at the address rtmp://mySvr.myDomain.com/App. As shown in the example depicted in FIG. 5, broadcasting iMCS 506 is a real-time messaging protocol (RTMP) server. It should be noted that alternative embodiments of the systems and methods described herein may also be implemented in other server-types.

In line 502, a communication stream is initiated between the publishing client and broadcasting iMCS 506. The first action performed in FIG. 5 is adding an audio stream to the open stream in line 503. The attachAudio method passes Microphone.get( ) object 507 which, in ACTIONSCRIPT™, constructs a new audio object for a microphone resource. As such, the live audio captured by the microphone resource will be attached to the new stream. The second action performed is to add a video stream in line 504. The attachVideo method passes Camera.get( ) object 508 which constructs a new video object for a camera resource. The live video signal captured by the camera will be attached to the new stream.

In the ACTIONSCRIPT™ model shown in FIG. 5, in order for a subscribing client to subscribe to and view a media stream, the stream generally is published to broadcasting iMCS 506. Line 505 preferably publishes a live stream called todays_news 509. The publish method of line 505 publishes the live audio and video that is being captured and placed onto the open stream by lines 503 and 504. This shows how the two separate media segments and possible different formats are combined into a single media stream, todays_news 509, published on broadcasting iMCS 506.

Multiple streams may preferably be open over a single connection, but in the embodiment described herein using the example programming model of ACTIONSCRIPT™, each stream either publishes or plays. The publishing client represented in FIG. 5 may also open a second stream to play the published stream, todays_news 509. In line 510 a second stream is opened over the connection. Line 511 shows a subscribing video object, myVideoArea, in which a video stream is added through the attachVideo( ) method. The added video stream is defined by line 512 by the call to play todays_news 509 to the open video stream. The publishing client may now view the streaming video as a subscriber.

FIG. 6 is a partial script listing demonstrating another embodiment of a capability to publish and subscribe to an example media stream according to the teachings described herein. Program segment 60 represents example code that may be used within the publishing client. In lines 600 and 601, a connection is established between the publishing client and broadcasting iMCS 604. Broadcasting iMCS 604 is located at the address rtmp://myRTMPServer.myDomain.com/app. In line 602, a new stream is initiated on the connection. A video stream is then added in line 603. The attachVideo method passes the Camera.get( ) object which constructs a new object for a camera resource. Video stream myWeddingVideo 606 is shown being published to the new stream in line 604.

Program segment 61 represents example code that may be used within the subscribing client. In lines 607 and 608, a connection is established between the subscribing client and broadcasting iMCS 605 at rtmp://myRTMPServer.myDomain.com/app. In line 609, a new stream is initiated on the connection. In line 610, the subscribing client plays video stream myWeddingVideo 606 being broadcast on broadcasting iMCS 605.

It should be noted that in different embodiments of the technology described herein, program code or script, such as that described in FIGS. 5 and 6, may be assigned to different user interface objects, such that users may preferably interact with elements on an iMR to execute commands or scripts that interact or operate with an iMCS. In the examples given with ACTIONSCRIPT™, the ACTIONSCRIPT™ code may be assigned to interface components of the MACROMEDIA FLASH™ player allowing the subscribing user to interact with the iMCS.

FIG. 7 is a partial script listing demonstrating another embodiment of a capability to publish and subscribe to an example media stream according to the teachings described herein. Program segment 70 represents example code that may be used within the iMCS. In line 700, the stream represented by stream object 705 is set up at the iMCS. Line 701 creates a condition that if the stream is successfully set up, the recorded stream object 706 will play for five seconds (line 702), followed by recorded stream object 707 for five seconds (line 703), followed by live stream object 708 for five seconds (line 704). Thus, the iMCS will be running stream object 705 comprising the three individual stream objects 706-708.

Program segment 71 represents example code that may be used within the iMR. In lines 709 and 710, a new connection is established between the iMR and iMCS 714 at rtmp://myRTMPServer.myDomain.com/appMM. In line 711, a new stream is initiated over the connection. Line 712 adds a video object to the newly initiated stream. Finally, the client plays stream object 705 in line 713. Thus, the client subscribes to the stream being played at iMCS 714 comprising two recorded segments 706 and 707, and one live segment 708.

It is also possible to provide for clients to subscribe to streams published from an iMCS in which the stream may be live or recorded. FIG. 8 is a partial script listing demonstrating another embodiment of a capability to publish and subscribe to an example media stream according to the teachings described herein. Program segment 80 represents example code that may be run from the iMCS or the publishing client. Much as with the example shown in FIG. 7, a stream is established from the iMCS that plays two recorded stream objects for five seconds each, followed by one live stream object for five seconds in lines 800, 801, 803-805. However, instead of merely streaming the multi-source stream, iMCS records the broadcast in line 802. By recording the multi-source stream, clients may subscribe to the broadcast stream whether or not the broadcast is live.

Program segment 81 represents example code that may be run from the iMR to subscribe to the published and recorded multi-source stream. Similar to the example from FIG. 7, a connection and stream are established in lines 807-811 with iMCS 812 at rtmp://myRTMPServer.myDomain.com/appMM where the client subscribes to stream object 806. Because iMCS 812 has recorded the broadcast multi-source stream, the client may either subscribe to the live stream if it is still being broadcast from iMCS 812, or may subscribe to the recorded version if the live broadcast is over.

When implemented in software, the elements of the present invention are essentially the code segments to perform the necessary tasks. The program or code segments can be stored in a computer readable medium or transmitted by a computer data signal embodied in a carrier wave, or a signal modulated by a carrier, over a transmission medium. The "computer readable medium" may include any medium that can store or transfer information. Examples of the computer readable medium include an electronic circuit, a semiconductor memory device, a ROM, a flash memory, an erasable ROM (EROM), a floppy diskette, a compact disk CD-ROM, an optical disk, a hard disk, a fiber optic medium, a radio frequency (RF) link, etc. The computer data signal may include any signal that can propagate over a transmission medium such as electronic network channels, optical fibers, air, electromagnetic, RF links, etc. The code segments may be downloaded via computer networks such as the Internet, Intranet, etc.

FIG. 9 illustrates computer system 900 adapted to use the embodiments as described herein. Any of the clients or servers depicted in FIGS. 2-4 may be implemented by computer system 900. Central processing unit (CPU) 901 is coupled to system bus 902. The CPU 901 may be any general purpose CPU, such as an INTERNATIONAL BUSINESS MACHINE's (IBM) PowerPC™, INTEL Pentium™-based processors or the like, or may be a special purpose CPU, such as an application specific integrated circuit (ASIC). However, the embodiments are not restricted by the architecture of CPU 901, as long as CPU 901 supports the operations as described herein. Bus 902 is coupled to random access memory (RAM) 903, which may be SRAM, DRAM, SDRAM, or the like. ROM 904 is also coupled to bus 902, which may be PROM, EPROM, EEPROM, or the like. RAM 903 and ROM 904 hold user and system data and programs as is well known in the art.

Bus 902 is also coupled to input/output (I/O) controller card 905, communications adapter card 911, user interface card 908, and display card 909. The I/O adapter card 905 connects to storage devices 906, such as one or more of a hard drive, a CD drive, a floppy disk drive, a tape drive, flash ROM, or the like to the computer system. Communications card 911 is adapted to couple the computer system 900 to a network 912, which may be one or more of a telephone network, a local (LAN) and/or a wide-area (WAN) network, an Ethernet network, and/or the Internet network implemented either using wireline and/or wireless transmission technology. User interface card 908 couples user input devices, such as keyboard 913, pointing device 907, or may also include input devices, such as touch-screens, telephone keypads, and the like, to the computer system 900. The display card 909 is driven by CPU 901 to control the display on display device 910, which may include devices, such as a computer monitor, a personal digital assistant (PDA) screen, a landline and/or wireless telephone, or the like.

FIG. 10 is a flowchart demonstrating the teachings of embodiments of a capability to publish and subscribe to an example media stream according to the teachings described herein. In step 1000, any combination of live and recorded media segments desired for broadcasting are chosen. In step 1001, the chosen segments are selectively combined in any desired order of live and recorded segments to form a multimedia stream. The multimedia stream is then published to an iMCS from any of the iMCS, an iMR, or another external resource, in step 1002. In step 1003, the multimedia stream is broadcast from the iMCS under control of either the iMCS or the iMR. In step 1004, a status, which comprises at least one of a time-progress and/or the content, of the broadcast multimedia stream is controlled from one of the iMCS or an iMR. Optionally, in step 1005, the broadcast multimedia stream is recorded by the iMCS. In step 1007, the iMR subscribes to the multimedia stream. Alternatively, if the multimedia stream was recorded in optional step 1005, a determination is made whether the stream is still being broadcast by the iMCS in step 1006. If so, then the iMR can subscribe directly in step 1007, or if not, the iMR may subscribe to the recorded multimedia stream.

FIG. 11 is a partial script listing demonstrating a further embodiment of a capability to publish to an existing media stream according to the teachings described herein. In the previous examples described herein. A media stream generally is published from an iMCS with client iMRs subscribing to the published stream. The present invention also allows stream subscribers to publish to or append content to existing streams. For example, the MacromediaNews stream from FIG. 8 is broadcast for other clients to subscribe to. Script 1100 is a representative script that may be executed at, a client iMR subscribing to the MacromediaNews stream of FIG. 8. In line 1101, the subscribing iMR client gets the stream. Line 1102 performs an error check to determine whether getting the stream has been successful. In line 1103, the pre-recorded file "introduction" is played on the MacromediaNews stream for 5 seconds. After the five seconds, a live feed from "live1" is played on the MacromediaNews stream, as directed in line 1104. The "false" parameter shown in line 1104 directs iMCS to play "live1" without resetting the stream. Therefore, all clients subscribing to MacromediaNews will get both "introduction" and whatever is playing from "live1." Therefore, even though the client iMR appending the media in script 1100 did not originate the MacromediaNews stream, it can add its own media to the stream.

Of course, it should be noted that in some embodiments, it may be beneficial to prevent everyone from being able to add media to the broadcasting streams. In these embodiments, access parameters may be established to grant rights for editing the streams.

Although the present invention and its advantages have been described in detail, it should be understood that various changes, substitutions and alterations can be made herein without departing from the spirit and scope of the invention as defined by the appended claims. Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

What is claimed is:

1. A system comprising:
a client including
a processor, and
a memory; and
the client configured to communicate with a multimedia communication server;
where communications between the client and the server are governed by an application programming interface that provides methods of control for the communications, including
a first method used by the client to selectively subscribe to media streams provided by the multimedia communication server and
a second method used by the client to publish a media stream to the multimedia communication server for provision by the multimedia communication server.

2. The system of claim 1, further comprising the multimedia communication server including a processor and a memory.

3. The system of claim 1, where the media stream published using the second method originates from one or more of: the multimedia communication server, the client, and an external resource.

4. The system of claim 1, where the media stream published using the second method comprises a live media segment and a recorded media segment.

5. The system of claim 1, where the interface allows the client to edit media content of a given stream during broadcasting of the given stream from the multimedia communication server to multiple clients.

6. The system of claim 1, where the memory included in the multimedia communication server is configured to record the media stream published using the second method.

7. A computer-implemented method comprising:
establishing a communication connection between an accessing client and a communication server configured to broadcast a media stream over a network, where the accessing client is configured to subscribe to the media stream broadcast from the communication server;
publishing a media stream from the accessing client to the communication server for broadcasting from the communication server; and
presenting the published media stream, which is broadcast from the communication server, on a display device.

8. The method of claim 7, further comprising:
sending a script from the accessing client to the communication server to control broadcasting of the published media stream.

9. The method of claim 7, where the media stream published from the accessing client comprises a live media segment and a recorded media segment.

10. The method of claim 7, further comprising:
editing media content of a given stream during broadcasting of the given stream from the communication server to multiple clients.

11. The method of claim 7, further comprising:
editing, from the accessing client, media content of a given stream during broadcasting of the given stream from the communication server to multiple clients.

12. The method of claim 7, further comprising:
manipulating, from the accessing client, a progress of a given stream during broadcasting of the given stream from the communication server to multiple clients.

13. The method of claim 7, further comprising:
selectively recording a media stream broadcast from the communication server.

14. A non-transitory computer readable medium with computer program logic recorded thereon, the computer program logic configured to cause one or more client computers to perform operations comprising:
subscribing to a multimedia stream transmitted to multiple clients from a communication server;
publishing a media stream to the communication server for transmission from the communication server to the multiple clients;
controlling time-progress of the published media stream; and
controlling content of the published media stream.

15. The computer readable medium of claim 14, where the operations further comprise:

issuing, through a client-side application program interface, scripts that are executable by the communication server to affect transmission of one or more media streams.

16. The computer readable medium of claim 14, where the published media stream comprises a live media segment and a recorded media segment.

17. The computer readable medium of claim 14, where the operations further comprise:

editing media content of a given stream during transmission of the given stream from the communication server to multiple clients.

18. The computer readable medium of claim 14, where the operations further comprise:

selectively recording a media stream transmitted from the communication server.

\* \* \* \* \*